United States Patent [19]

Bryant

[11] Patent Number: 5,741,883
[45] Date of Patent: Apr. 21, 1998

[54] TOUGH, SOLUBLE, AROMATIC, THERMOPLASTIC COPOLYIMIDES

[75] Inventor: Robert G. Bryant, Poquoson, Va.

[73] Assignee: The United States of America as represented by the Administrator of the National Aeronautics and Space Administration, Washington, D.C.

[21] Appl. No.: 359,752

[22] Filed: Dec. 16, 1994

[51] Int. Cl.$^6$ .............................. C08G 73/10; C08G 69/26
[52] U.S. Cl. .......................... 528/353; 528/125; 528/128; 528/172; 528/173; 528/176; 528/185; 528/188; 528/220; 528/229; 528/350; 524/600; 524/606; 526/935; 478/396; 478/473.5; 478/411.1
[58] Field of Search ........................... 528/125, 128, 528/172, 173, 176, 185, 188, 220, 229, 350, 353; 428/396, 473.5, 441.1; 524/600, 606; 526/935

[56] References Cited

U.S. PATENT DOCUMENTS 5,147,966  9/1992  St. Clair et al. ........................ 528/188
5,171,828 12/1992  Meterko et al. ....................... 528/353
5,268,446 12/1993  Tamai et al. .......................... 528/353

OTHER PUBLICATIONS

Polymer Preprints 35(1), Mar., 1994, Smith et al "Chemistry & Properties of Phenylethynyl Phthalic Anhydride Imide Oligomers", pp. 353–354.
Journal of Polymer Science Part A 32(16), pp. 3061–3067, Hergenrother et al, "Phenylethynyl–terminated Imide Oligomers & Polymers Therefrom".
Polymer Preprints, vol. 35, No. 1, Mar. 1, 1994, Bryant, pp.517–518, "A Soluble copolyimide".

Primary Examiner—P. Hampton-Hightower
Attorney, Agent, or Firm—George F. Helfrich

[57] ABSTRACT

Tough, soluble, aromatic, thermoplastic copolyimides were prepared by reacting 4,4'-oxydiphthalic anhydride, 3,4,3',4'-biphenyltetracarboxylic dianhydride and 3,4'-oxydianiline. These copolyimides were found to be soluble in common amide solvents such as N,N'-dimethyl acetamide, N-methylpyrrolidinone, and dimethylformamide allowing them to be applied as the fully imidized copolymer and to be used to prepare a wide range of articles.

42 Claims, No Drawings

TOUGH, SOLUBLE, AROMATIC, THERMOPLASTIC COPOLYIMIDES

ORIGIN OF THE INVENTION

The invention described herein was made by an employee of the United States Government, and may be manufactured and used by or for the Government without payment of any royalties thereon or therefor.

BACKGROUND OF THE INVENTION

1. Field of the Invention

The present invention relates to copolyimides. In particular, it relates to soluble copolyimides prepared from 4,4'-oxydiphthalic anhydride, 3,4,3',4'-biphenyltetracarboxylic dianhydride and 3,4'-oxydianiline.

2. Description of the Related Art

Aromatic, thermoplastic polyimides are a class of polymers used in a variety of high performance/high temperature applications. Such applications include adhesives, matrix resins for composites, and high strength films and coatings. These thermoplastic polyimides are usually soluble in either high boiling polar protic phenolic solvents, such as m-cresol and chlorophenol or halogenated solvents such as tetrachloroethylene and multihalogenated aromatics, many of which are highly toxic and are not used in large scale industrial processes without solvent recovery systems. Thus, the majority of polyimide thermoplastics are solution processed in the polyamic acid state using milder solvents and subsequently cyclodehydrated to form the final polyimide article. However, there is a disadvantage to using the polyamic acid intermediates in that they are unstable, susceptible to hydrolysis, and generate water during imidization.

Attempts to increase the solubility of polyimides generally involve the modification of the polymer backbone through monomer selection. These modifications include the incorporation of flexible aliphatic units, polar and nonpolar pendent substituents, heteroatoms or groups, and polyimide copolymers which contain either mixtures of the above monomers with common aromatic diamines and dianhydrides, or block segments of soluble oligomers. Although most of these polyimides meet and even exceed some of the criteria required to find wide spread use as high performance materials, cost limits their acceptance.

By the present invention, wholly aromatic, thermoplastic polyimide copolymers were prepared based on 4,4'-oxydiphthalic anhydride, 3,4,3',4'-biphenyltetracarboxylic dianhydride and 3,4'-oxydianiline. These copolyimides were found to be tough thermoplastics which are soluble in common amide solvents such as N,N'-dimethyl acetamide (DMAc), N-methylpyrrolidinone (NMP), and dimethyl formamide (DMF) and thus can be applied as the fully imidized copolymer in addition to the amic acid solution.

Meterko et al. (U.S. Pat. No. 5,171,828) had prepared copolyimides from 4,4'-oxydiphthalic anhydride, 3,4,3',4'-biphenyltetracarboxylic dianhydride and 4,4'-oxydianiline or para-phenylenediamine. The difference between the present invention and that of Meterko et al. lies in the use of 3,4'-oxydianiline as compared to 4,4'-oxydianiline. Meterko et al. prepared polyimide films by pouring the polyamic acid into the desired form. The polyamic acid was then cured either by heating or through chemical imidization. Meterko et al. found that their copolyimides had unexpectedly high comparative tracking indexes which made the copolyimides useful as insulators for various electronic applications. It is important to note that Meterko et al. applied their copolyimide as a polyamic acid prior to imidizing and not as an imidized solution.

St. Clair et al. (U.S. Pat. No. 5,147,966) prepared polyimide molding powders, coatings, adhesives and matrix resins from 3,4'-oxydianiline and 4,4'-oxydiphthalic anhydride. They found that by preparing polyimides and polyamic acids from these monomers, along with suitable endcaps, adhesives, composite matrix resins, neat resin moldings, and films or coatings had identical or superior properties to commercially available polyimides. Unfortunately, as with Meterko et al., these polyimide homopolymers were applied as the amic acid solution.

Tamai et al. (U.S. Pat. No. 5,268,446) prepared readily melt-processable polyimides by reacting 3,3',4,4'-biphanyltetracarboxylic dianhydride with 3,4'-oxydianiline. They found that these polyimides had excellent processability and chemical resistance in addition to essential heat resistance. These polymers may be used in various fields such as electric and electronic appliances, space and aeronautical equipment and transportation machinery. They note in example 1 that the polyimide was insoluble in halogenated hydrocarbon solvents such as methylene chloride and chloroform. In addition, they prepared films from the amic acid solution instead of from the imide powder.

An object of the present invention is to prepare a tough, soluble, aromatic, thermoplastic copolyimide.

Another object of the invention is to prepare a diverse group of articles from the copolyimide.

SUMMARY OF THE INVENTION

The foregoing and additional objects of the invention were achieved by preparing a tough, soluble, aromatic, thermoplastic copolyimide by reacting 4,4'-oxydiphthalic anhydride with 3,4,3',4'-biphenyltetracarboxylic dianhydride and 3,4'-oxydianiline.

The tough, soluble, aromatic, thermoplastic copolyimide may be used to prepare the following articles: a solvent cast film, an extrudable object, a fiber-reinforced composite, a neat resin molding, a coating, a hot-melt adhesive film, a hot-melt adhesive cloth, a hot-melt adhesive tape, a fiber, a filled resin molding and a matrix composite. The matrix composite further comprises a powder. As a preferred embodiment, this powder is selected from the group consisting of: plastic, metal, graphite and ceramic.

The copolyimide of the present invention may be terminated with either a monofunctional anhydride or a monofunctional amine endcapper. The endcapper is added to the copolyimide at an amount ranging from about 2 mole percent to about 10 mole percent. An example of this endcapper is phthalic anhydride. These endcapped copolyimides may be used to prepare the articles listed above.

The 4,4'-oxydiphthalic anhydride and the 3,4,3',4'-biphenyltetracarboxylic dianhydride are added to the 3,4'-oxydianiline at a ratio of 4,4'-oxydiphthalic anhydride to 3,4,3',4'-biphenyltetracarboxylic dianhydride ranging from about 25 mole percent to about 75 mole percent (25:75) to about 75 mole percent to about 25 mole percent (75:25). These copolyimides may be endcapped with either a monofunctional anhydride or a monofunctional amine at an amount ranging from about 2 mole percent to about 10 mole percent. The preferred endcapper is phthalic anhydride. The articles prepared from these copolyimides are the same as those listed above.

In particular, the 4,4'-oxydiphthalic anhydride and the 3,4,3',4'-biphenyltetracarboxylic dianhydride are added to the 3,4'-oxydianiline at a ratio of 50 mole percent 4,4'-oxydiphthalic anhydride to 50 mole percent 3,4,3',4'-biphenyltetracarboxylic dianhydride. An endcapper such as a monofunctional anhydride or a monofunctional amine may also be added to the copolyimide at an amount ranging from about 2 mole percent to about 10 mole percent. Preferably, the endcapper is phthalic anhydride. These copolyimides may be used to prepare the articles which are listed above.

DESCRIPTION OF THE PREFERRED EMBODIMENTS

By the present invention, a copolyimide was prepared by reacting 4,4'-oxydiphthalic anhydride (ODPA) with 3,4,3',4'-biphenyltetracarboxylic dianhydride (BPDA) and 3,4'-oxydianiline (3,4'-ODA). This copolyimide has the following repeat unit:

any powder which may withstand the high processing temperature. As a preferred embodiment, the powder may be a plastic, metal, graphite or ceramic powder.

The degree of solubility of these copolyimides can be controlled by the processing conditions used to prepare the copolyimide. Several factors were found to affect the solubility of the copolyimide. One of these factors was the mole ratio of ODPA to BPDA. In addition, the percentage of solids and the solvent used to synthesize the copolyimide was also found to have an effect on the solubility. For example, it was observed that when the ratio of ODPA to BPDA was 75 mole percent to 25 mole percent (75/25), and the copolyimide was prepared at 30% solids in NMP, a turbid gel formed when the solution was cooled to room temperature. However, for the same mole ratio, when a 15% solids solution was prepared, the copolyimide remained soluble in NMP when the solution was cooled to room

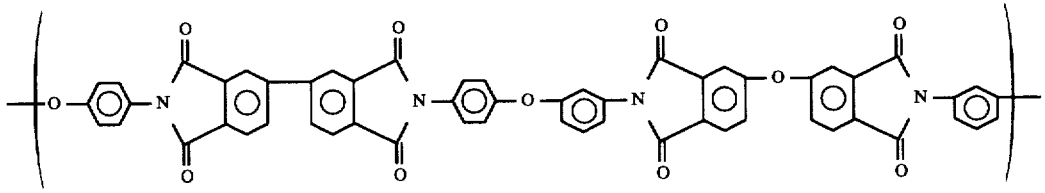

and has been found to be a tough thermoplastic material. In addition, the copolyimide may be redissolved in common amide solvents such as DMAc, NMP and DMF after the imide powder has been formed, provided that the polyimide is not exposed to temperatures above its glass transition temperature (Tg). (Typically, once a polyamic acid has been converted to the imide, it cannot be redissolved in common amide solvents.) This unique property, allows these copolyimides to be used for a large number of applications. For example films, which were cast from the copolyimide after it had been dissolved in solvent and dried above the Tg were found to exhibit high modulus, good chemical resistance and be self bonding. The self bonding property and insolubility above the Tg allows layered films and coatings to be prepared. These copolyimides can also be extruded which provides them with the capability to form a wide range of objects. Because of their unique combination of properties, fiber-reinforced composites can also be prepared from these copolyimides. Coatings prepared from these copolyimides were successfully used to coat Kapton®, glass, aluminum, copper, ceramic and titanium substrates. It was found that these copolyimides are capable of bonding to themselves as well as many other materials and thus, they are useful as hot-melt adhesive films, hot-melt adhesive cloths and hot-melt adhesive tapes. As yet another application, these copolyimides find utility as neat resin moldings and filled resin moldings, and can be processed at temperatures slightly below the Tg of the copolyimide which can be readily machined and polished. Matrix composites, which can also be processed at temperatures slightly below the Tg of the copolyimide, have been successfully prepared from these copolyimides. These composites were prepared by combining the copolyimide with whiskers and/or a powder. Any powder known to those skilled in the art may be used. Examples of these powders include but are not limited to: graphite, ceramic, metal, plastic, copper, iron, diamond dust, polyimide powder, boron, aluminum, and chopped carbon fibers. More specifically, ceramic powders such as silicon nitride, quartz, zirconia, mixed oxides and aluminum oxide may be used. Plastic powders which may be used include temperature. For a 50/50 mole ratio of ODPA to BPDA copolyimide prepared in NMP, it was found that the copolyimide remained soluble and if allowed to remain undisturbed for 6 to 48 hours (depending on the percent solids) formed a thermally and mechanically reversible gel when the copolyimide was prepared using up to 60% solids. When DMAc was substituted as the solvent, the copolyimide was soluble at 15% solids but precipitated out at 30% solids. As with the 75/25 ODPA/BPDA ratio, copolyimides synthesized at a molar ratio of 25/75 ODPA/BPDA were found to remain soluble in NMP at 30% solids during imidization but when cooled to room temperature formed either a turbid gel or an elastomeric homogeneous gel. At 15% solids in NMP, the copolyimides remained soluble. It was also observed that all of the copolyimides remained soluble in m-cresol. In addition to controlling the mole ratio and percent solids, it was found that controlling the molecular weight of the copolyimide affected the sol-gel behavior.

In order to control the molecular weight of these copolyimides, the stoichiometry may be offset and the copolyimide may be terminated with an endcapper such as a monofunctional anhydride or a monofunctional amine. A preferred endcapper is phthalic anhydride. The endcapper may be added to the copolyimide at an amount ranging from about 2 mole percent to about 10 mole percent depending on the desired properties of the copolyimide. The addition of the endcapper may allow for better processing in some instances.

As a preferred embodiment of the invention, it was found that good results were obtained when the ODPA and the BPDA were added to the 3,4'-ODA at a ratio of ODPA to BPDA ranging from about 25 mole percent to about 75 mole percent (25:75) to about 75 mole percent to about 25 mole percent (75:25). More preferably, the best results were obtained when the ratio of ODPA to BPDA was 50 mole percent to 50 mole percent (50:50). The addition of an endcapper such as a monofunctional amine or a monofunctional anhydride allowed for molecular weight control which provides versatility in the final end-use of the copolyimides.

The following examples illustrate the preparation and use of the copolyimides. These examples are merely illustrative and intended to enable those skilled in the art to practice the invention in all of the embodiments flowing therefrom, and do not in any way limit the scope of the invention as defined by the claims.

EXAMPLES

Example 1

In a 500 mL resin kettle equipped with a nitrogen inlet, overhead stirring assembly, Dean-Stark trap, and condenser were placed ODPA (commercially available from Imitec, Inc.) (17.0257 g, 0.0549 mol), BPDA (commercially available from Ube Industries, Inc.) (5.4137 g, 0.0184 mol), 3,4'-ODA (commercially available from Mitsui Toatsu Chemical Co.) (15.0231 g, 0.07502 mol), phthalic anhydride (0.4533 g, 0.00306 mol) and NMP (216 g). The solution was stirred overnight at room temperature. Toluene (50 g) was added to the solution and the mixture was heated to 165° C. for 7 hours during which time water was removed by azeotropic distillation. The reaction was cooled to room temperature. The solution was forced through a 5 μm filter. The copolyimide was precipitated using water and chopped in a blender. The resulting polymer powder (bright yellow in color) was collected by filtration, extracted with methanol for 48 hours and dried in vacuo at 200° C. for 9 hours.

Example 2

In a 100 mL resin kettle equipped with a nitrogen inlet, overhead stirring assembly, Dean-Stark trap, and condenser were placed ODPA (15.9407 g, 0.0514 mol), BPDA (5.0395 g, 0.0171 mol), 3,4'-ODA (14.1435 g, 0.0706 mol), phthalic anhydride (0.6277 g, 0.0042 mol) and NMP (81.5 g). The solution was stirred overnight at room temperature. Toluene (20 g) was added to the solution and the mixture was heated to 165° C. for 7 hours during which time water was removed by azeotropic distillation. The reaction was cooled to room temperature forming a turbid gel. The copolyimide was precipitated in water and chopped with a blender. The resulting polymer powder (bright yellow in color) was collected by filtration, extracted with methanol for 48 hours and dried in vacuo at 200° C. for 9 hours.

Example 3

In a 500 mL resin kettle equipped with a nitrogen inlet, overhead stirring assembly, Dean-Stark trap, and condenser were placed ODPA (16.0239 g, 0.05165 mol), BPDA (15.1975 g, 0.05165 mol), 3,4'-ODA (20.6862 g, 0.1033 mol) and NMP (120 g). The solution was stirred overnight at room temperature forming a heavy gel. Toluene (25 g) was added to the solution and the mixture was heated to 165° C. for 7 hours, during which time water was removed by azeotropic distillation. The reaction was cooled to room temperature. The solution was forced through a 5 μm filter. The remaining copolyimide powder was precipitated using water and chopped in a blender. The resulting polymer powder (bright yellow in color) was collected by filtration, extracted with methanol for 48 hours and dried in vacuo at 200° C. for 12 hours.

Example 4

In a 1 L resin kettle equipped with a nitrogen inlet, overhead stirring assembly, Dean-Stark trap and condenser were placed ODPA (35.8835 g, 0.1156 mol), BPDA (34.0329 g, 0.1156 mol), 3,4'-ODA (46.7922 g, 0.2367 mol), phthalic anhydride (0.6922 g, 0.00467 mol) and NMP (274 g). The solution was stirred overnight at room temperature. Toluene (50 g) was added to the solution and the mixture was heated to 165° C. for 7 hours, during which time water was removed by azeotropic distillation. The reaction was cooled to room temperature. The solution was forced through a 5 μm filter. The copolyimide was precipitated using water and chopped in a blender. The resulting polymer powder (bright yellow in color) was collected by filtration, extracted with methanol for 48 hours and dried in vacuo at 180° C. for 9 hours.

Example 5

In a 1 L resin kettle equipped with a nitrogen inlet, overhead stirring assembly, Dean-Stark trap and condenser were placed ODPA (213.13 g, 0.6870 mol), BPDA (202.14 g, 0.6870 mol), 3,4'-ODA (280.76 g, 1.4020 mol), phthalic anhydride (8.3072 g, 0.0561 mol) and NMP (1640 g). The solution was stirred overnight at room temperature. Toluene (300 g) was added to the solution and the mixture was heated to 165° C. for 7 hours, during which time water was removed by azeotropic distillation. The reaction was cooled to room temperature. The solution was forced through a 5 μm filter. The copolyimide was precipitated using water and chopped in a blender. The resulting copolyimide powder (bright yellow in color) was collected by filtration, extracted with methanol for 48 hours and dried in vacuo at 180° C. for 9 hours.

Example 6

In a 1 L resin kettle equipped with a nitrogen inlet, overhead stirring assembly, Dean-Stark trap, and condenser were placed ODPA (39.2347 g, 0.1265 mol), BPDA (37.2112 g, 0.1265 mol), 3,4'-ODA (51.6841 g, 0.2581 mol), phthalic anhydride (1.5292 g, 0.0132 mol) and DMAc (740 g). The solution was stirred overnight at room temperature. Toluene (100 g) was added to the solution and the mixture was heated to 165° C. for 7 hours during which time water was removed by azeotropic distillation. The reaction was cooled to room temperature. The solution was forced through a 5 μm filter. The copolyimide was precipitated using water and chopped in a blender. The resulting polymer powder (bright yellow in color) was collected by filtration, extracted with methanol for 48 hours and dried in vacuo at 200° C. for 12 hours.

Example 7

In a 1 L resin kettle equipped with a nitrogen inlet, overhead stirring assembly, Dean-Stark trap, and condenser were placed ODPA (3.6850 g, 0.01246 mol), BPDA (3.6656 g, 0.01246 mol), 3,4'-ODA (5.0922 g, 0.02543 mol), phthalic anhydride (0.1506 g, 0.00102 mol) and m-cresol (38 g). The solution was stirred overnight at room temperature forming a slurry. The mixture was heated to 195° C. for 6 hours. The reaction was cooled to room temperature. The solution was forced through a 5 μm filter. The copolyimide was precipitated using methanol and chopped in a blender. The resulting copolyimide powder (bright yellow in color) was collected by filtration, extracted with methanol for 48 hours and dried in vacuo at 180° C. for 9 hours.

Example 8

In a 1 L resin kettle equipped with a nitrogen inlet, overhead stirring assembly, Dean-Stark trap, and condenser were placed ODPA (38.8358 g, 0.1251 mol), BPDA (36.8329 g, 0.1251 mol), 3,4'-ODA (15.6861 g, 0.2581 mol), phthalic anhydride (2.2939 g, 0.0155 mol) and NMP (303 g).

The solution was stirred overnight at room temperature. Toluene (23 g) was added to the solution and the mixture was heated to 165° C. for 7 hours during which time water was removed by azeotropic distillation. The reaction was cooled to room temperature. The solution was forced through a 5 μm filter. The copolyimide was precipitated using water and chopped in a blender. The resulting polymer powder (bright yellow in color) was collected by filtration, extracted with methanol for 48 hours and dried in vacuo at 200° C. for 9 hours.

Example 9

In a 1 L resin kettle equipped with a nitrogen inlet, overhead stirring assembly, Dean-Stark trap, and condenser were placed ODPA (40.3856 g, 0.1301 mol), BPDA (38.3028 g, 0.1301 mol), 3,4'-ODA (55.4641 g, 0.2769 mol), phthalic anhydride (4.9232 g, 0.03324 mol) and NMP (325 g). The solution was stirred overnight at room temperature. Toluene (35 g) was added to the solution and the mixture was heated to 165° C. for 7 hours during which time water was removed by azeotropic distillation. The reaction was cooled to room temperature. The solution was forced through a 5 μm filter. The copolyimide was precipitated using water and chopped in a blender. The resulting polymer powder (bright yellow in color) was collected by filtration, extracted with methanol for 48 hours and dried in vacuo at 180° C. for 9 hours.

Example 10

In a 1 L resin kettle equipped with a nitrogen inlet, overhead stirring assembly, Dean-Stark trap, and condenser were placed ODPA (41.1663 g, 0.1327 mol), BPDA (39.0432 g, 0.1327 mol), 3,4'-ODA (55.9411 g, 0.2793 mol), phthalic anhydride (4.1379 g, 0.02794 mol) and NMP (327 g). The solution was stirred overnight at room temperature. Toluene (30 g) was added to the solution and the mixture was heated to 165° C. for 7 hours, during which time water was removed by azeotropic distillation. The reaction was cooled to room temperature. The solution was forced through a 5 μm filter. The copolyimide was precipitated using water and chopped in a blender. The resulting polymer powder (bright yellow in color) was collected by filtration, extracted with methanol for 48 hours and dried in vacuo at 180° C. for 9 hours.

Example 11

In a 500 mL resin kettle equipped with a nitrogen inlet, overhead stirring assembly, Dean-Stark trap, and condenser were placed ODPA (5.9869 g, 0.0193 mol), BPDA (17.0345 g, 0.0579 mol), 3,4'-ODA (15.7326 g, 0.07877 mol), phthalic anhydride (0.4667 g, 0.00315 mol) and NMP (225 g). The solution was stirred overnight at room temperature. Toluene (50 g) was added to the solution and the mixture was heated to 165° C. for 7 hours, during which time water was removed by azeotropic distillation. The reaction was cooled to room temperature. The solution was forced through a 5 μm filter. The copolyimide was precipitated using water and chopped in a blender. The resulting polymer powder (bright yellow in color) was collected by filtration, extracted with methanol for 48 hours and dried in vacuo at 200° C. for 9 hours.

Example 12

In a 100 mL resin kettle equipped with a nitrogen inlet, overhead stirring assembly, Dean-Stark trap, and condenser were placed ODPA (5.5076 g, 0.01775 mol), BPDA (15.6707 g, 0.05326 mol), 3,4'-ODA (14.5104 g, 0.07246 mol), phthalic anhydride (0.4293 g, 0.0029 mol) and NMP (84 g). The solution was stirred overnight at room temperature. Toluene (15 g) was added to the solution and the mixture was heated to 165° C. for 7 hours during which time water was removed by azeotropic distillation. The reaction was cooled to room temperature forming a solid gel. The gel was placed in water and chopped with a blender. The resulting polymer powder (bright yellow in color) was collected by filtration, extracted with methanol for 48 hours and dried in vacuo at 200° C. for 9 hours.

Example 13

Copolyimide films were prepared from polyamic acid solutions using the following procedure. The polyamic acid solutions were doctored onto plate glass and placed in a dust free chamber until they were tack free. The dry polyamic acid films were cured at 100°, 200° and 300° C. for 1 hour each in air. The thin films were cut into 0.20 inch strips and the tensile properties were determined at several temperatures. These properties are given in Table 1.

TABLE 1

| ODPA/BPDA ratio | Test Temperature (°C.) | Tensile Strength Ksi | Tensile Modulus Ksi | % Elongation |
| --- | --- | --- | --- | --- |
| 100/0 (control) | 23 | 18.2 ± 1 | 468 ± 2 | 6.8 ± 1 |
| 75/25 | 23 | 17.6 ± 1.1 | 443 ± 26 | 17.1 ± 11 |
| | 150 | 10.6 ± 0.6 | 306 ± 14 | 21.6 ± 14 |
| | 177 | 8.8 ± 0.5 | 261 ± 27 | 22.2 ± 25 |
| 50/50 | 23 | 17.4 ± 0.4 | 451 ± 14 | 9.5 ± 1 |
| | 150 | 10.1 ± 0.7 | 363 ± 19 | 9.0 ± 6 |
| | 177 | 9.1 ± 0.7 | 332 ± 14 | 5.8 ± 4 |
| 25/75 | 23 | 18.9 ± 0.4 | 469 ± 7 | 7.0 ± 1.5 |
| | 150 | 10.0 ± 1.0 | 297 ± 4 | 9.3 ± 4 |
| | 177 | 8.0 ± 0.6 | 250 ± 20 | 18.9 ± 15 |
| 0/100 (control) | 23 | 17.1 ± 2 | 589 ± 25 | 4.7 ± 0.8 |
| | 150 | 12.3 ± 1 | 371 ± 13 | 3.6 ± 0.5 |
| | 177 | 11.2 ± 1 | 354 ± 33 | 3.4 ± 0.6 |

Example 14

A Copolyimide film was prepared directly from the reaction mixture containing BPDA/ODPA (50/50), 3,4'-ODA copolyimide at a 2% offset ratio according to the following procedure. The copolyimide solution was doctored onto plate glass and placed in a dust free chamber until it was tack free. The dry copolyimide film was heated at 100°, 200° and 300° C. for 1 hour each in air. The thin film was cut into 0.20 inch strips and the tensile properties were determined at several temperatures. The results are given in Table 2.

TABLE 2

| Casting Solvent | Test Temperature (°C.) | Tensile Strength (Ksi) | Tensile Modulus (Ksi) | % Elongation | Color |
| --- | --- | --- | --- | --- | --- |
| NMP | 23 | 20.6 ± 2 | 588 ± 80 | 7.2 ± 2 | Dark |
| | 150 | 12.6 ± 0.8 | 369 ± 31 | 24 ± 15 | Orange |
| | 177 | 11.1 ± 1 | 382 ± 57 | 33 ± 20 | |

Example 15

The following procedure was followed to prepare copolyimide films from the copolyimide powder. Copolyimide powders prepared at 2% offset were dissolved in a NMP/toluene or mixed xylenes (9/1 weight) solution over a 12 hour period at 23° C. to form 10–15% by weight solid solutions. These copolyimide solutions were doctored onto plate glass and placed in a dust free chamber until they were tack free. The copolyimide films were heated under several conditions: 100° and 200° C.; 100° and 225° C.; 100°, 200°, 300° C.; or 100°, 225° and 350° C. for 1 hour each in air. The films were removed from the glass plates by soaking in water. The thin films were cut into 0.20 to 0.75 inch strips and used for adhesive bonding, solvent resistance and the determination of tensile properties. The unoriented thin film properties for the films cured at 100°, 200° and 300° C. for 1 hour each in air are listed in Table 3.

TABLE 3

| ODPA/BPDA ratio | Test Temperature (°C.) | Tensile Strength (Ksi) | Tensile Modulus (Ksi) | % Elongation |
|---|---|---|---|---|
| 50/50 | 23 | 20.6 ± 2 | 588 ± 80 | 7.2 ± 2 |
|  | 150 | 12.6 ± 0.8 | 382 ± 57 | 24 ± 15 |
|  | 177 | 11.1 ± 1 | 369 ± 31 | 33 ± 20 |
| 25/75 | 23 | 18.2 ± 2 | 491 ± 64 | 25 ± 13 |
|  | 150 | 11.2 ± 1 | 361 ± 38 | 24 ± 22 |
|  | 177 | 9.9 ± 0.7 | 294 ± 14 | 82 ± 40 |

Example 16

Neat resin moldings were prepared from the copolyimide powder using the following procedure. The copolyimide powder (2% offset) was placed in a stainless steel mold which had been pretreated with a release agent. Various molding conditions (summarized in Table 4) were used to form consolidated moldings. The glass transition temperature (Tg) was determined from the molding flash using Differential Scanning Calorimetry (DSC) at a heating rate of 20° C. per minute. The results are given in Table 4. Neat resin properties of the molded specimens were also tested. These properties are summarized in Table 5.

TABLE 4

| ODPA/BPDA Ratio | Temperature (°C.) | Pressure (PSI) | Time (Minutes) | Tg (°C.) 1st Run | Tg (°C.) 2nd Run |
|---|---|---|---|---|---|
| 25/75 | 300 | 200 | 30 | 236 | 243 |
| 25/75 | 350 | 200 | 30 | 240 | 245 |
| 50/50 | 225 | 3000 | 30 | 227 | 251 |
| 50/50 | 250 | 2000 | 30 | 240 | 251 |
| 50/50 | 300 | 200 | 30 | 248 | 251 |
| 50/50 | 350 | 150 | 30 | 245 | 253 |
| 75/25 | 350 | 200 | 30 | 258 | 259 |

TABLE 5

| ODPA/ BPDA ratio | Molding Conditions | Test Temp. (°C.) | Tensile Modulus (GPa) | Tensile Strength MPa) | $K_{1c}^{a}$ (GNm$^{-3/2}$) | $G_{1c}^{b}$ (KJ/m$^2$) |
|---|---|---|---|---|---|---|
| 50/50 | 250° C. ½ hour 2000 psi | 23 | — | — | 3.5 | — |
| 50/50 | 300° C. ½ hour 200 psi | 23 | 4.23 | 111.2 | 4.4 | 4.6 |
|  |  | 177 | 3.16 | 42.8 | — | — |
| 50/50 | 350° C. ½ hour 150 psi | 23 | 4.45 | 111.2 | 4.3 | 4.2 |
|  |  | 177 | 3.26 | 53.1 | — | — |

$^a$From compact tension specimens.
$^b$From data compact tension and microdumbell.

Example 17

Physical and thermal properties were determined for copolyimide (PI) solutions and thin films which were prepared having a 3% offset ratio and endcapped with phthalic anhydride. The inherent viscosities ($\eta_{inh}$) were obtained in copolyimide/NMP solutions (0.5 g/dL) at 25° C. as well as for the polyamic acids (PAA). Differential scanning calorimetry (DSC) was performed on copolyimide films (dried at 100°, 200° and 300° C. for 1 hour in air) at a heating rate of 20° C./min with the glass transition temperature (Tg) taken at the inflection point in the heat flow vs. temperature curve and the melting temperature (Tm) taken at the minimum of the endothermic depression. Thermogravimetric analysis (TGA) was performed on the polyimide films at a heating rate of 2.5° C./min under flowing air and nitrogen. Polymer densities were obtained at 23° C. using thin films (cured at 100°, 200° and 300° C. for 1 hour in air) and a density gradient column consisting of aqueous zinc chloride. These results are given in Table 6.

TABLE 6

| ODPA/BPDA ratio | $\eta_{inh}$(dL/g) PAA | $\eta_{inh}$(dL/g) PI | DSC Tg (°C.) | DSC Tm (°C.) | 5% Weight Loss Air (°C.) | 5% Weight Loss N$_2$ (°C.) | Density (g/ml) |
|---|---|---|---|---|---|---|---|
| 100/0 (control) | 0.23 | Ins. | 232 | 291 | 491 | 491 | 1.389 ± 1e$^{-3}$ |
| 75/25 | 0.44 | 0.37$^a$ | 239 | — | 474 | 480 | 1.376 ± 4e$^{-4}$ |
| 50/50 | 0.40 | 0.33 | 248 | — | 484 | 484 | 1.376 ± 7e$^{-4}$ |
| 25/75 | 0.44 | 0.45$^a$ | 253 | — | 510 | 508 | 1.378 ± 2e$^{-4}$ |
| 0/100 (control) | 0.54 | Ins. | 260 | 387 | 490 | 493 | 1.406 ± 6e$^{-4}$ |
| 50/50 (4,4'-ODA) | 0.60 | Ins. | 240 | 315 | 491 | 492 | >1.45 |

$^a$2% offset polyimide polymerized in a 15% solids NMP solution.
Ins. — insoluble Example 18

Melt viscosities were run on copolyimides having an offset in stoichiometry ranging from 1% to 5% and had been endcapped with phthalic anhydride. The ratio of ODPA to BPDA was 50/50. Table 7 summarizes the results.

TABLE 7

| % Offset | Extrusion Temperature (°C.) | Melt Viscosity (Poise) |
|---|---|---|
| 1 | 290 | >6,000,000 |
|  | 304 | 3,951,000 |
|  | 338 | 610,000 |
| 2 | 285 | 4,028,000 |
|  | 303 | 603,000 |
|  | 337 | 351,000 |
| 3 | 281 | 1,318,000 |
|  | 303 | 311,000 |
|  | 340 | 93,000 |
| 4 | 285 | 351,000 |
|  | 303 | 127,000 |
|  | 340 | 30,000 |
| 5 | 285 | 269,000 |
|  | 303 | 92,000 |
|  | 337 | 9,000 |

Example 19

Adhesion testing was conducted using a 50/50 BPDA/ODPA copolyimide having a 2% offset in stoichiometry. Lap shear joints were constructed using titanium (Ti, 6Al-4V) coupons as the substrates. One bonding film was solvent cast and dried at 200° C. for 1 hour in air to provide a thin film with approximately a 5% volatile content. Another bonding film was solvent cast and dried at 100°, 200° and 300° C. for 1 hour each in air to provide a film which had less than 0.1% volatiles. Scrim cloth samples were coated several times and dried at 100° and 225° C. for 1 hour each in air between coats with a final soak at 300° C. for 30 minutes. The bonding conditions and results from this testing are given in Table 8.

TABLE 8

| Adhesive | Bonding Conditions | Test Temperature (°C.) | Bondline (mils) | Shear Strength (psi) |
|---|---|---|---|---|
| Thin Film | 50 psi | 23 | 2.1 | 5600 |
| ~5% | 300° C. | 150 | 1.2 | 5000 |
| volatiles | 30 minutes | 177 | 1.5 | 3900 |
| Thin Film | 50 psi | 23 | 3.9 | 4365 |
| <0.1% | 350° C. | 150 | 2.8 | 3760 |
| volatiles | 30 minutes | 177 | 3.9 | 3360 |
| Scrim Cloth | 15 psi/350° C./30 min | 23 | 11.5 | 4030 |
| 0.3% | 25 psi/350° C./30 min | 23 | 12.0 | 4405 |
| volatiles | 50 psi/350° C./30 min | 23 | 13.5 | 5230 |

Example 20

Matrix composites were prepared using a 50/50 blend of BPDA/ODPA at a 2% offset and endcapping with phthalic anhydride. Iron, diamond dust, Upilex R® plastic powder, quartz, graphite and graphite/copper combinations were the powders used to prepare the composites. In this example, the copolyimide serves as a binder for the particles. Table 9 summarizes the fabrication conditions for these composites. Three point bend geometry testing was performed on the graphite and graphite/copper composites at 23° C. The results of this testing are given in Table 10. Parts prepared from these composites could be cut and machined to form various parts or molded directly to form different objects for various unique applications.

TABLE 9

| Material (total weight %) | Polyimide (total weight %) | Molding Conditions min/Ksi/°C. | Density (g/cm³) |
|---|---|---|---|
| Iron (98) | 2 | 30/40/250–350 | 6.98 |
| Diamond Dust (95) | 5 | 30/20/350 | 2.75 |
| Upilex R® (95) | 5 | 30/10/350 | 1.41 |
| Quartz (95) | 5 | 30/5/350 | 1.72 |
| Quartz (95) | 5 | 30/10/350 | 1.71 |
| Quartz (95) | 5 | 30/20/350 | 1.77 |
| Quartz (90) | 10 | 30/10/350 | 1.83 |
| Graphite (86.5) | 13.5 | 30/10/250 | 1.89 |
| Graphite/Copper (85/5) | 10 | 30/1.5/350 | 1.85 |
| Graphite/Copper (85/5) | 10 | 30/5/350 | 2.00 |
| Graphite/Copper (76/19) | 5 | 30/5/350 | 2.09 |

TABLE 10

| Material Composition (% by weight) | Molding Conditions min/Ksi/°C. | Flexural Modulus (Msi) | Flexural Strength (psi) | % Strain |
|---|---|---|---|---|
| Graphite/PI (86.5/13.5) | 30/10/300 | 2.36 | 6130 | 0.3 |
| Graphite/Copper/PI (85/5/10) | 30/1.5/350 | 3.00 | 7610 | 0.3 |
| Graphite/Copper/PI (85/5/10) | 30/5/350 | 2.40 | 5400 | 0.3 |
| Graphite/Copper/PI (76/19/5) | 30/5/350 | 2.50 | 5400 | 0.3 |

PI — copolyimide

Example 21

The following procedure was followed to dip coat a copper wire. A 10% solution of the copolyimide in NMP was prepared. A 10 gauge copper wire was dipped into the solution and dried at 300° C. for 1 hour in air. This process was repeated several times to build up a multi-layer protective coating. The coated copper wire could be bent without causing the coating to peel away from the wire.

Example 22

The following procedure was used to prepare a molding of a filled copolyimide. The 50/50 BPDA/ODPA 2% offset polyimide powder was mixed with a blend of 15% by weight of graphite powder and 10% by weight of Teflon® powder. The mixture was blended using a shaker and subsequently compression molded at 300° C. for 30 minutes at 200 psi to afford a solid uniform block. The block was machined and cut to various shapes.

Example 23

Substrates were coated using the following procedure. A solution consisting of 10% by weight of the 50/50 BPDA/ODPA 2% offset polyimide was doctored onto clean Kapton® and aluminum foil. The coated substrates were placed into a dust free chamber until they were tack-free. The tack-free, coated substrates were then treated at 100°, 200° and 300° C. for one hour each in air. The substrates were then folded in half with the copolyimide to the inside and placed in a hot press for consolidation. The press was set at 300° C. and 100 psi and the exposure time was 15 minutes. This yielded a self-bonded material which could not be torn apart without destroying the substrates.

Example 24

The following procedure was used to mold particles which had been coated with the copolyimide to substrates. Graphite powder which had been coated with a 10% by weight 50/50 BPDA/ODPA 2% offset copolyimide was placed in a stainless steel mold. A piece of aluminum foil which had been coated with 50/50 BPDA/ODPA 2% offset copolyimide was placed on top of the graphite powder with the coating facing the graphite powder to form a composite preform. The composite preform was molded at 300° C. and 5000 psi for 30 minutes to form a consolidated graphite part having a foil backing. The aluminum foil could not be removed without being destroyed.

Example 25

The following example is for the preparation of a composite from the copolyimide. A 30% by weight solids in NMP solution of BPDA/ODPA 50/50 copolyimide having a 3% offset ratio was used to solution coat continuous IM-7 carbon fibers (commercially available from Hercules) creating a 3 inch wide unidirectional tape. This tape was then cut into 3×3 inch and 3×6 inch sections (plies) and stacked to form panels which were 12 and 24 plies thick. The panels were consolidated at 300° C. and 200 psi for 1 hour to yield a consolidated continuous carbon fiber composite.

Example 26

The following procedure was used to form thermally and mechanically reversible gels from the copolyimides. Several liquid solutions consisting of 10%, 30% and 60% by weight solids in NMP were prepared from 50/50 BPDA/ODPA copolyimides having a 2% offset. The liquid solutions were made through direct synthesis of the copolyimide and by redissolving the required amount of the copolyimide in the solvent. The liquid solutions were allowed to stand for 24 hours at room temperature whereby a thick gel formed. The gelled solutions were then heated until the liquid solution reformed. In addition to heating the gelled solutions, the 10% and 30% by weight gelled solutions were mechanically agitated to reform the liquid solution. The reformed liquid solutions were allowed to stand at room temperature which caused the gel to reform. As a result, the sol-gel process was shown to be both thermally and mechanically reversible. This is demonstrated by the DSC data shown in Table 11.

TABLE 11

| Weight % Solids of Gel | 1st Run Tm (°C.) | 2nd Run Tm (°C.) |
|---|---|---|
| 30 | 119 | None Detected |
| 60 | 178 | None Detected |

Example 27

Solvent resistance testing was performed on a copolyimide prepared from BPDA/ODPA (50/50) 2% offset polyimide film which had been dried at 300° C. The thin films were weighed and twisted around a steel paper clip which was subsequently placed into a jar containing a specific solvent for 10 days. After removing the films from the jar, they were blotted dry, visually examined, weighed and creased. The results from this test along with the respective solvents which were used are recorded in Table 12.

TABLE 12

| Solvent | Test Temp | Weight Loss | Appearance |
|---|---|---|---|
| Water | 23° C. | <0.1% | NCC, Creasible |
| Jet Fuel | 23° C. | <0.1% | NCC, Creasible |
| Toluene | 23° C. | <0.1% | NCC, Creasible |
| MEK | 23° C. | <0.1% | NCC, Creasible |
| Methylene Chloride | 23° C. | <0.1% | NCC, Wrinkled, Creasible |
| Hydraulic Fluid (TSP Based) | 23° C. | <0.1% | NCC, Creasible |
| NMP | 23° C. | 7.5% | NCC, Some Fracture |
| THF | 23° C. | <0.1% | NCC., Creasible |
| Ethylene Glycol | 23° C. | <0.1% | NCC, Creasible |

NCC = No Color Change

Example 28

The following procedure was followed to prepare a sprayable dielectric coating. A formulated solution of BPDA/ODPA 50/50 2% offset copolyimide (10% solids in NMP) was applied to different substrates using an airbrush. Examples of these substrates include: glass, ceramic, aluminum, Kapton®, copper, Yttrium stabilized zirconia (YSZ), and Lead Zirconate Titanate (PZT). The coating was initially dried in air at 44° C. and subsequently at 300° C.. The typical coating thickness range was from 0.00025 inches to 0.0005 inches. The coating was found to serve as a good dielectric adhesive which readily accepted the deposition of gold, copper and aluminum circuitry, showing that the ultra-thin coating of the copolyimide forms an excellent finish for allowing the attachment of dissimilar electronic materials to various substrates.

Example 29

Thin film multilayer flexible circuits were prepared using the BPDA/ODPA 50/50 2% offset copolyimide (10% solids by weight in NMP) solution as a film substrate and as a spray, to fabricate multilayer thin films. The process involved metallizing a piece of the copolyimide film by means of evaporation or sputtering and transferring a circuit pattern to the metallized film by means of a standard photolithography process.

The copolyimide was solvent cast onto a releasable surface such as glass to afford a film thickness ranging from 0.0003 inches to 0.0005 inches. The copolyimide film was initially dried at 44° C. and dried at a final temperature of 300° C. for 30 minutes. The film was then metallized and patterned using a standard photolithography process. After the circuit was formed, multiple coats of the copolyimide solution (1 part of BPDA/ODPA 50/50 2% offset to 8 parts of NMP solvent by weight) were sprayed to isolate the newly formed circuit. The sprayed coating was dried in a similar manner and metallized with 300 Angstroms of chrome and 2,000 Angstroms of gold. A circuit was patterned onto the newly coated film using the same photolithography process. This process was repeated multiple times in order to form a multilayer thin film flexible circuit.

Example 30

The following process was used to bond films and foils together. BPDA/ODPA 50/50 2% offset copolyimide (10% solids in NMP) solution was sprayed onto various polyimide films and aluminum/copper foils in order to bond them together. After the film or foil was sprayed with the copolyimide, it was dried at 100° and 250° C. for one hour each in air. The film and foil were stacked and hot pressed at a temperature of 300° C. using 100 psi for 15 minutes to secure the bond. The bonded film could be flexed without delamination showing that it could be used in the formation of ultra-thin multilayer polyimide metal-film laminates.

What is claimed is:

1. A tough, soluble, aromatic, thermoplastic copolyimide prepared by reacting 4,4'-oxydiphthalic anhydride with 3,4, 3',4'-biphenyltetracarboxylic dianhydride and 3,4'-oxydianiline.

2. An article prepared from the tough, soluble, aromatic, thermoplastic copolyimide according to claim 1, wherein the article is selected from the group consisting of: a solvent cast film, an extrudable object, a fiber-reinforced composite, a neat resin molding, a coating composition, a hot-melt adhesive film, a hot-melt adhesive cloth, a hot-melt adhesive tape, a fiber, a filled resin molding and a matrix composite.

3. An article prepared from the tough, soluble, aromatic, thermoplastic copolyimide according to claim 2, wherein the matrix composite comprises a powder.

4. An article prepared from the tough, soluble, aromatic, thermoplastic copolyimide according to claim 3, wherein the powder is selected from the group consisting of: plastic, metal, graphite and ceramic.

5. A tough, soluble, aromatic, thermoplastic copolyimide according to claim 1, wherein the copolyimide is terminated by an endcapper selected from the group consisting of: a monofunctional anhydride and a monofunctional amine.

6. A tough, soluble, aromatic, thermoplastic copolyimide according to claim 5, wherein the endcapper is added to the copolyimide at an amount ranging from about 2 mole percent to about 10 mole percent.

7. An article prepared from the tough, soluble, aromatic, thermoplastic copolyimide according to claim 5, wherein the article is selected from the group consisting of: a solvent cast film, an extrudable object, a fiber-reinforced composite, a neat resin molding, a coating composition, a hot-melt adhesive film, a hot-melt adhesive cloth, a hot-melt adhesive tape, a fiber, a filled resin molding and a matrix composite.

8. An article prepared from the tough, soluble, aromatic, thermoplastic copolyimide according to claim 7, wherein the matrix composite comprises a powder.

9. An article prepared from the tough, soluble, aromatic, thermoplastic copolyimide according to claim 8, wherein the powder is selected from the group consisting of: plastic, metal, graphite and ceramic.

10. A tough, soluble, aromatic, thermoplastic copolyimide according to claim 5, wherein the monofunctional anhydride is phthalic anhydride.

11. A tough, soluble, aromatic, thermoplastic copolyimide according to claim 10, wherein the phthalic anhydride is added to the copolyimide at an amount ranging from about 2 mole percent to about 10 mole percent.

12. An article prepared from the tough, soluble, aromatic, thermoplastic copolyimide according to claim 11, wherein the article is selected from the group consisting of: a solvent cast film, an extrudable object, a fiber-reinforced composite, a neat resin molding, a coating composition, a hot-melt adhesive film, a hot-melt adhesive cloth, a hot-melt adhesive tape, a fiber, a filled resin molding and a matrix composite.

13. An article prepared from the tough, soluble, aromatic, thermoplastic copolyimide according to claim 12, wherein the matrix composite comprises a powder.

14. An article prepared from the tough, soluble, aromatic, thermoplastic copolyimide according to claim 13, wherein the powder is selected from the group consisting of: plastic, metal, graphite and ceramic.

15. A tough, soluble, aromatic, thermoplastic copolyimide according to claim 1, wherein the 4,4'-oxydiphthalic anhydride and the 3,4,3',4'-biphenyltetracarboxylic dianhydride are added to the 3,4'-oxydianiline at a ratio of 4,4'-oxydiphthalic anhydride to 3,4,3',4'-biphenyltetracarboxylic dianhydride ranging from about 25 mole percent to about 75 mole percent to about 75 mole percent to about 25 mole percent.

16. An article prepared from the tough, soluble, aromatic, thermoplastic copolyimide according to claim 15, wherein the article is selected from the group consisting of: a solvent cast film, an extrudable object, a fiber-reinforced composite, a neat resin molding, a coating composition, a hot-melt adhesive film, a hot-melt adhesive cloth, a hot-melt adhesive tape, a fiber, a filled resin molding and a matrix composite.

17. An article prepared from the tough, soluble, aromatic, thermoplastic copolyimide according to claim 16, wherein the matrix composite comprises a powder.

18. An article prepared from the tough, soluble, aromatic, thermoplastic copolyimide according to claim 17, wherein the powder is selected from the group consisting of: plastic, metal, graphite and ceramic.

19. A tough, soluble, aromatic, thermoplastic copolyimide according to claim 15, wherein the copolyimide is terminated with an endcapper selected from the group consisting of: a monofunctional anhydride and a monofunctional amine.

20. A tough, soluble, aromatic, thermoplastic copolyimide according to claim 19, wherein the endcapper is added to the copolyimide at an amount ranging from about 2 mole percent to about 10 mole percent.

21. An article prepared from the tough, soluble, aromatic, thermoplastic copolyimide according to claim 20, wherein the article is selected from the group consisting of: a solvent cast film, an extrudable object, a fiber-reinforced composite, a neat resin molding, a coating composition, a hot-melt adhesive film, a hot-melt adhesive cloth, a hot-melt adhesive tape, a fiber, a filled resin molding and a matrix composite.

22. An article prepared from the tough, soluble, aromatic, thermoplastic copolyimide according to claim 21, wherein the matrix composite comprises a powder.

23. An article prepared from the tough, soluble, aromatic, thermoplastic copolyimide according to claim 22, wherein the powder is selected from the group consisting of: plastic, metal, graphite and ceramic.

24. A tough, soluble, aromatic, thermoplastic copolyimide according to claim 19, wherein the monofunctional anhydride is phthalic anhydride.

25. A tough, soluble, aromatic, thermoplastic copolyimide according to claim 24, wherein the phthalic anhydride is added to the copolyimide at an amount ranging from about 2 mole percent to about 10 mole percent.

26. An article prepared from the tough, soluble, aromatic, thermoplastic copolyimide according to claim 25, wherein the article is selected from the group consisting of: a solvent cast film, an extrudable object, a fiber-reinforced composite, a neat resin molding, a coating composition, a hot-melt adhesive film, a hot-melt adhesive cloth, a hot-melt adhesive tape, a fiber, a filled resin molding and a matrix composite.

27. An article prepared from the tough, soluble, aromatic, thermoplastic copolyimide according to claim 26, wherein the matrix composite comprises a powder.

28. An article prepared from the tough, soluble, aromatic, thermoplastic copolyimide according to claim 27, wherein the powder is selected from the group consisting of: plastic, metal, graphite and ceramic.

29. A tough, soluble, aromatic, thermoplastic copolyimide according to claim 15, wherein the ratio of 4,4'-oxydiphthalic anhydride to 3,4,3',4'-biphenyltetracarboxylic dianhydride is 50 mole percent to 50 mole percent.

30. An article prepared from the tough, soluble, aromatic, thermoplastic copolyimide according to claim 29, wherein the article is selected from the group consisting of: a solvent cast film, an extrudable object, a fiber-reinforced composite, a neat resin molding, a coating composition, a hot-melt adhesive film, a hot-melt adhesive cloth, a hot-melt adhesive tape, a fiber, a filled resin molding and a matrix composite.

31. An article prepared from the tough, soluble, aromatic, thermoplastic copolyimide according to claim 30, wherein the matrix composite comprises a powder.

32. An article prepared from the tough, soluble, aromatic, thermoplastic copolyimide according to claim 31, wherein the powder is selected from the group consisting of: plastic, metal, graphite and ceramic.

33. A tough, soluble, aromatic, thermoplastic copolyimide according to claim 29, wherein the copolyimide is terminated with an endcapper selected from the group consisting of: a monofunctional anhydride and a monofunctional amine.

34. A tough, soluble, aromatic, thermoplastic copolyimide according to claim 33, wherein the endcapper is added to the copolyimide at an amount ranging from about 2 mole percent to about 10 mole percent.

35. An article prepared from the tough, soluble, aromatic, thermoplastic copolyimide according to claim 34, wherein the article is selected from the group consisting of: a solvent cast film, an extrudable object, a fiber-reinforced composite, a neat resin molding, a coating composition, a hot-melt adhesive film, a hot-melt adhesive cloth, a hot-melt adhesive tape, a fiber, a filled resin molding and a matrix composite.

36. An article prepared from the tough, soluble, aromatic, thermoplastic copolyimide according to claim 35, wherein the matrix composite comprises a powder.

37. An article prepared from the tough, soluble, aromatic, thermoplastic copolyimide according to claim 36, wherein the powder is selected from the group consisting of: plastic, metal, graphite and ceramic.

38. A tough, soluble, aromatic, thermoplastic copolyimide according to claim 33, wherein the monofunctional anhydride is phthalic anhydride.

39. A tough, soluble, aromatic, thermoplastic copolyimide according to claim 38, wherein the phthalic anhydride is added to the copolyimide at an amount ranging from about 2 mole percent to about 10 mole percent.

40. An article prepared from the tough, soluble, aromatic, thermoplastic copolyimide according to claim 39, wherein the article is selected from the group consisting of: a solvent cast film, an extrudable object, a fiber-reinforced composite, a neat resin molding, a coating composition, a hot-melt adhesive film, a hot-melt adhesive cloth, a hot-melt adhesive tape, a fiber, a filled resin molding and a matrix composite.

41. An article prepared from the tough, soluble, aromatic, thermoplastic copolyimide according to claim 40, wherein the matrix composite comprises a powder.

42. An article prepared from the tough, soluble, aromatic, thermoplastic copolyimide according to claim 41, wherein the powder is selected from the group consisting of: plastic, metal, graphite and ceramic.

* * * * *